(12) United States Patent
Song

(10) Patent No.: US 12,724,226 B2
(45) Date of Patent: Sep. 1, 2026

(54) FRAME MODULE OF OPTICAL ACTUATOR DRIVEN BY SHAFT SLIDING METHOD

(71) Applicant: SM TECH CO., LTD, Hwaseong-si (KR)

(72) Inventor: Jaihyun Song, Hwaseong-si (KR)

(73) Assignee: SM TECH CO., LTD, Hwaseong-si (KR)

( * ) Notice: Subject to any disclaimer, the term of this patent is extended or adjusted under 35 U.S.C. 154(b) by 0 days.

(21) Appl. No.: 19/043,400

(22) Filed: Jan. 31, 2025

(65) Prior Publication Data

US 2025/0370215 A1 Dec. 4, 2025

(30) Foreign Application Priority Data

May 28, 2024 (KR) ........................ 10-2024-0069290

(51) Int. Cl.
*G02B 7/08* (2021.01)

(52) U.S. Cl.
CPC ...................................... *G02B 7/08* (2013.01)

(58) Field of Classification Search
CPC ...... G02B 27/646; G02B 6/3514; G02B 7/08; G02B 7/09; G02B 7/182; G02B 15/173; G02B 15/14; G02B 15/177; G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08; G02B 26/004; G02B 26/0808; G02B 26/0816; G02B 27/0911; G02B 27/644;

(Continued)

(56) References Cited

U.S. PATENT DOCUMENTS 12,153,336 B2 * 11/2024 Wang ........................ G03B 5/00
2017/0205753 A1 * 7/2017 Matsuda .................. F16H 1/46

(Continued)

FOREIGN PATENT DOCUMENTS

KR 10-2011-0097280 A 8/2011
KR 10-1653762 B1 9/2016

(Continued)

*Primary Examiner* — Stephone B Allen
*Assistant Examiner* — Tamara Y. Washington
(74) *Attorney, Agent, or Firm* — Revolution IP, PLLC

(57) ABSTRACT

Disclosed is a frame module applied to an optical actuator, the frame module including a base, a carrier configured to be movable relative to the base in an optical axis direction, and a shaft disposed on any one of the base and the carrier, the shaft being disposed long in the optical axis direction, the shaft being made of metal, wherein the other of the base and the carrier includes a shaft guide groove extending long from one surface thereof facing the shaft in the optical axis direction, the shaft guide groove being configured to receive at least a part of the shaft thereinto.

7 Claims, 13 Drawing Sheets

(58) Field of Classification Search

CPC .......... G02B 3/14; G02B 7/021; G02B 7/025; G02B 7/18; G02B 7/24; G02B 7/28; G02B 9/00; G02B 9/24; H04N 5/23287; H04N 5/2252; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; H04N 5/23261; H04N 5/23274; H04N 5/238; H04N 23/58; H04N 23/687; H04N 23/55; G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092; H02K 41/0356

See application file for complete search history.

(56) References Cited

U.S. PATENT DOCUMENTS

| | | | | |
|---|---|---|---|---|
| 2018/0299641 | A1* | 10/2018 | Hu | G02B 7/09 |
| 2018/0348504 | A1* | 12/2018 | Sekii | H02K 7/003 |

FOREIGN PATENT DOCUMENTS

| | | | | |
|---|---|---|---|---|
| KR | 10-2020-0048979 | A | 5/2020 | |
| KR | 102303499 | B1 * | 6/2020 | G03B 13/36 |
| KR | 10-2020-0144349 | A | 12/2020 | |
| KR | 10-2555970 | B1 | 7/2023 | |

* cited by examiner (a)

(b)

(a) (b)

(a)

(b)

(a)

(b)

FRAME MODULE OF OPTICAL ACTUATOR DRIVEN BY SHAFT SLIDING METHOD

CROSS-REFERENCE TO RELATED APPLICATION

This application claims the benefit of Korean Patent Application No. 10-2024-0069290 filed on May 28, 2024, in the Korean Intellectual Property Office, which is hereby incorporated by reference in its entirety.

BACKGROUND OF THE INVENTION

Field of the Invention

The present invention relates to a frame module applied to an optical actuator, and more particularly to a frame module including a base and a carrier configured to be movable relative to the base via a shaft made of metal.

Description of the Related Art

Portable electronic devices such as smartphones, tablets, and laptop computers, drones, vehicles, etc. are equipped with an optical module, such as a small camera, as a basic item. An actuator having an autofocus (AF) function of linearly moving a lens in an optical axis direction to adjust the focal distance to a subject is used as the optical module.

Korean Registered Patent No. 10-2303499 (hereinafter referred to as the "prior art document") discloses an "optical actuator". According to the prior art document, a magnet (or a coil) is installed on a carrier, which is a moving body equipped with a lens, a coil (or a magnet) is installed on a housing, which is a stationary body, and electromagnetic force is generated between the coil and the magnet such that the carrier can be moved in an optical axis direction or in a direction perpendicular to the optical axis. In addition, a ball is interposed between the moving body and the stationary body to continuously maintain an appropriate distance between the moving body and the stationary body, and the carrier may be moved more flexibly and accurately due to the rotational motion of the ball and minimal friction through point contact with the ball.

In the prior art document, however, the carrier is moved at high speed over a very short distance in contact with a ball bearing each time the autofocus function is repeatedly performed, whereby the carrier may be subjected to strong external impact such as drop. If the carrier is made of a synthetic resin, the surface of the carrier facing the ball bearing may be dented due to the surface hardness problem caused by the material characteristics, resulting in deterioration of the autofocus function.

In addition, the part of the carrier in contact with the ball (i.e., a guide rail) may be severely worn, and flow marks or shrinkage formed due to injection molding adversely affect the normal operation and durability of a product.

In addition, due to the recent increase in complexity of the structure and market demands, the product is becoming larger, and the load applied to the guide rail is increasing, and therefore it is necessary to take countermeasures thereagainst.

Prior Art Document

Patent Documents

Patent Document 1 Korean Registered Patent No. 10-2303499

SUMMARY OF THE INVENTION

It is an object of the present invention to provide a frame module applied to an optical actuator that solves the problem of stamping and denting at the surface of a rail in contact with a ball in a conventional structure in which the movement of a carrier is implemented using the ball.

It is another object of the present invention to provide a frame module capable of precisely controlling the position of the carrier, reliably maintaining the degree of precision of the carrier, and preventing distortion of the carrier due to impact.

It is yet another object of the present invention to provide a frame module that increases the range of movement of the carrier compared to the conventional structure using the ball.

It is a further object of the present invention to provide a frame module capable of reducing the cost of a product by simplifying an assembly process.

A frame module of an optical actuator according to the present invention includes a base, a carrier configured to be movable relative to the base in an optical axis direction, and a shaft disposed on any one of the base and the carrier, the shaft being disposed long in the optical axis direction, the shaft being made of metal.

The other of the base and the carrier may include a shaft guide groove extending long from one surface thereof facing the shaft in the optical axis direction, the shaft guide groove being configured to receive at least a part of the shaft therein.

The base and the carrier may be disposed such that one surrounds the other when viewed in the optical axis direction.

The shaft may be disposed on an inner peripheral surface of the one. The shaft guide groove may be disposed in an outer peripheral surface of the other facing the inner peripheral surface of the one.

Alternatively, the base and the carrier may be disposed such that one surrounds the other when viewed in the optical axis direction, the shaft may be disposed on an outer peripheral surface of the other, and the shaft guide groove may be disposed in an inner peripheral surface of the one facing the outer peripheral surface of the other.

The shaft guide groove may include a bottom surface and first and second inclined surfaces extending obliquely from both sides of the bottom surface, respectively, the first and second inclined surfaces being configured to form an inlet through which the shaft is inserted.

The shaft may be in contact with the first and second inclined surfaces.

Alternatively, the shaft guide groove may include a bottom surface and first and second inclined surfaces extending obliquely from both sides of the bottom surface, respectively, the first and second inclined surfaces being configured to form an inlet through which the shaft is inserted, and the frame module may further include a first guide surface portion disposed on the first inclined surface, the first guide surface portion being in contact with the shaft, the first guide surface portion being made of metal, and a second guide surface portion disposed on the second inclined surface, the second guide surface portion being in contact with the shaft, the second guide surface portion being made of metal.

The frame module may further include a lubricant receiving recess formed in an inner surface of the shaft guide groove so as to be depressed therefrom, the lubricant receiving recess being configured to receive lubricant.

Each of the base and the carrier may be made of a synthetic resin, and may be formed by injection molding in the state in which the shaft is inserted therein.

DETAILED DESCRIPTION OF THE INVENTION

The technical ideas described in embodiments of the present invention may be practiced independently or in combination. In addition, although the present invention will be described based on embodiments described in the detailed description of the invention given with reference to the drawings, these embodiments are exemplary only, and those skilled in the art to which the present invention pertains will appreciate that various modifications and equivalents thereto are possible therefrom. Accordingly, the technical protection scope of the present invention is to be defined by the appended claims.

Figure 1:
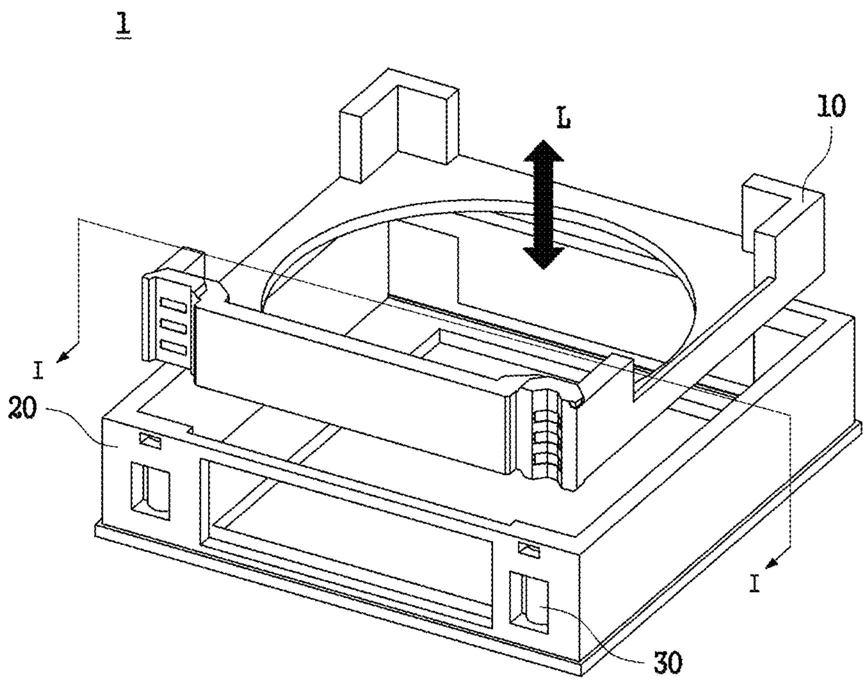
FIG. 1 is a view showing an embodiment of a frame module applied to an optical actuator.
Figure 2:
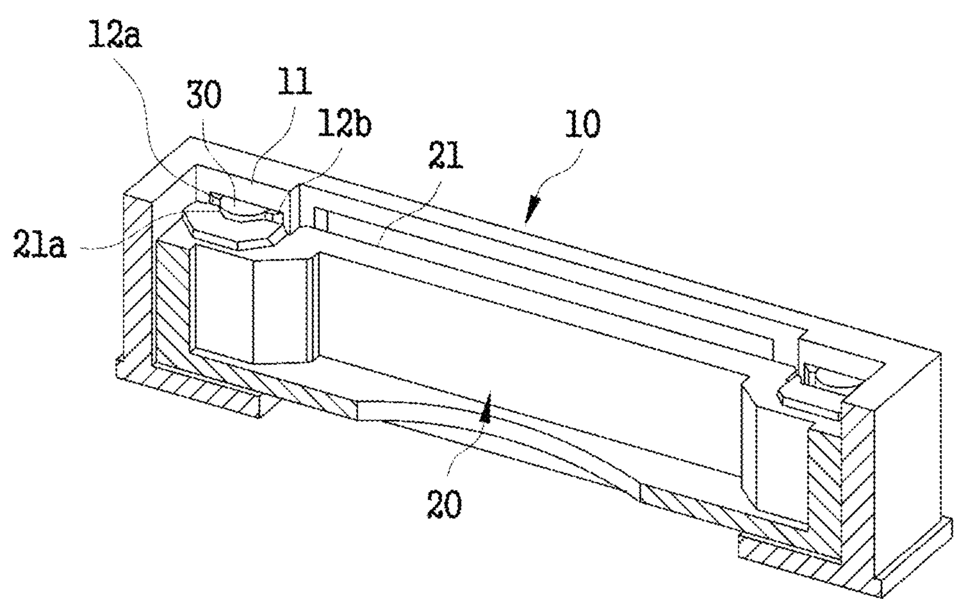
FIG. 2 is a sectional view taken along line I-I of FIG. 1 in the state in which the frame module is assembled.
Figure 3:
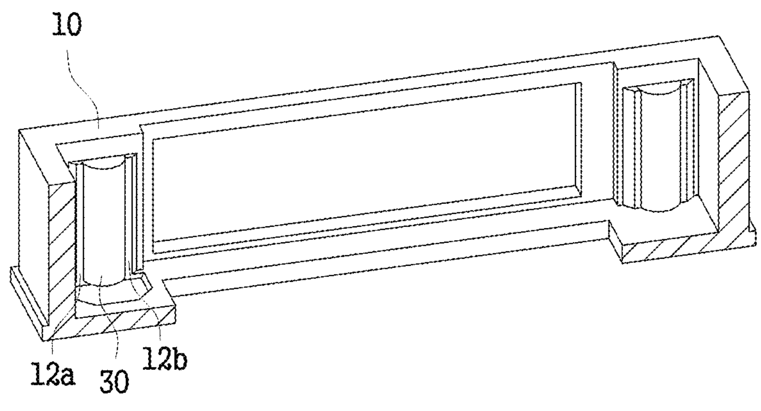
FIG. 3 is a view of an assembly of a base and a shaft shown in FIG. 2 when viewed from above (a) and when viewed from below (b)
Figure 3:
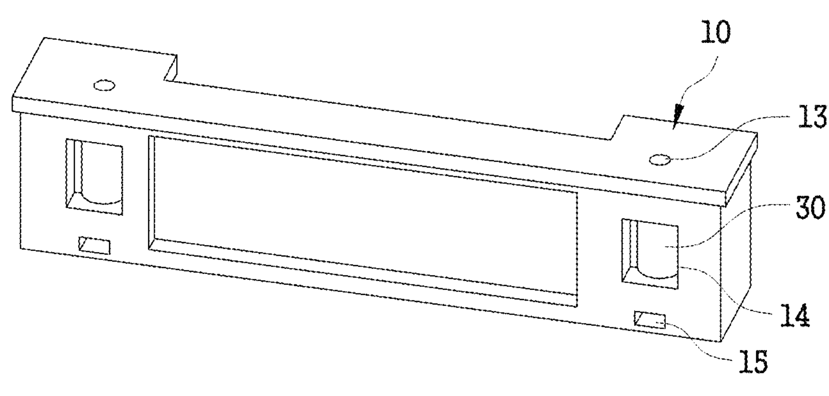
Figure 4:
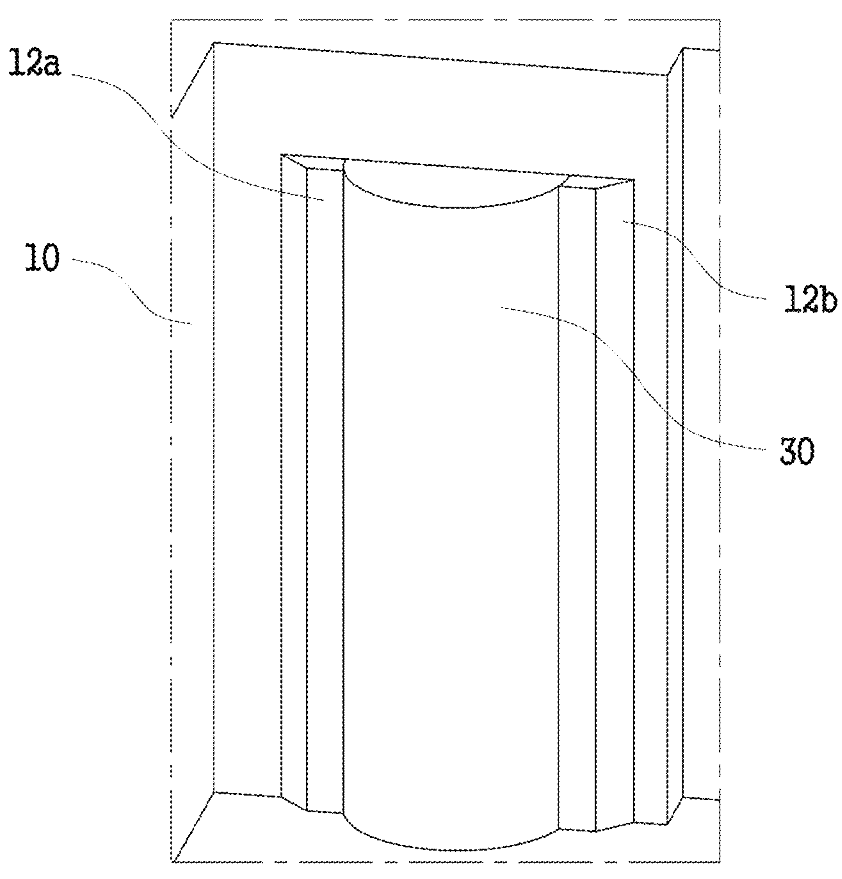
FIG. 4 is a partial enlarged view of FIG. 3(*a*)
Figure 5:
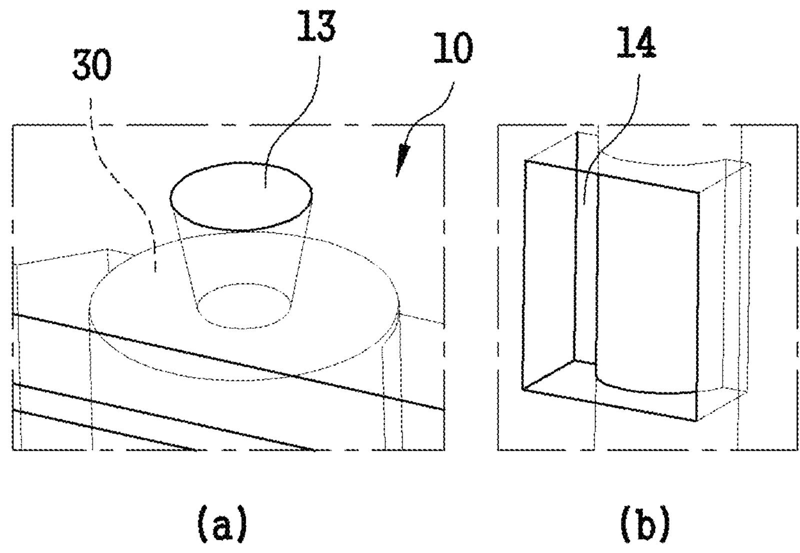
FIG. 5 is an enlarged view (a) of a position adjustment hole shown in FIG. 3 and an enlarged view (b) of a position alignment hole shown in FIG. 3.
Figure 6:
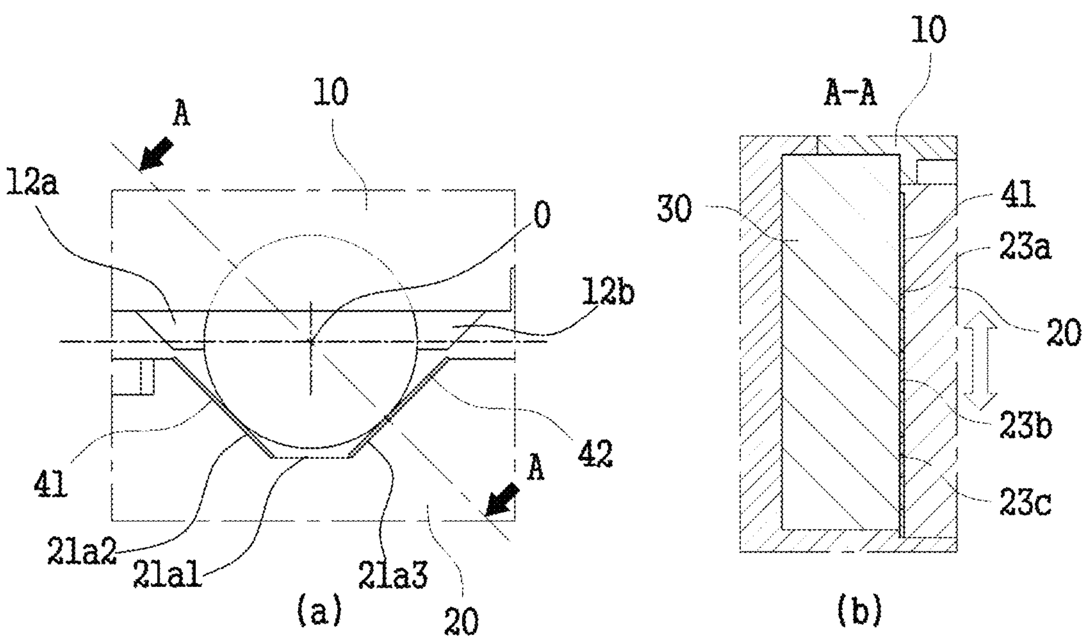
FIG. 6 is a view (a) showing a part of the frame module and a sectional view (b) taken along line A-A of FIG. 6(*a*)

FIG. 1 is a view showing an embodiment of a frame module applied to an optical actuator. FIG. 2 is a sectional view taken along line I-I of FIG. 1 in the state in which the frame module is assembled. FIG. 3 is a view of an assembly of a base and a shaft shown in FIG. 2 when viewed from above (a) and when viewed from below (b). FIG. 4 is a partial enlarged view of FIG. 3(*a*). FIG. 5 is an enlarged view (a) of a position adjustment hole shown in FIG. 3 and an enlarged view (b) of a position alignment hole shown in FIG. 3. FIG. 6 is a view (a) showing a part of the frame module and a sectional view (b) taken along line A-A of FIG. 6(*a*). Hereinafter, the frame module of the actuator according to the embodiment of the present invention will be described with reference to FIGS. 1 to 6.

The frame module 1 according to the embodiment of the present invention, which is applied to the optical actuator, includes a base 10, a carrier 20 and a shaft 30 made of metal. The carrier 20 is configured to be movable relative to the base 10, and the movement of the carrier 20 is performed via the shaft 30.

Specifically, the carrier 20 may be configured to be movable relative to the base 10 in an optical axis direction L. The shaft 30 may be formed in a bar shape having a predetermined length, may be disposed on any one of the carrier 20 and the base 10, and may be disposed long in the optical axis direction L.

Although not shown, a lens and a magnet (or a coil) may be installed on the carrier 20, and a coil (or a magnet) may be installed on the base 10.

The carrier 20 may be moved in the optical axis direction L by electromagnetic force acting between the coil and the magnet, and in this process, the shaft 30 may be disposed on any one of the base 10 and the carrier 20, and a shaft guide groove 21*a* configured to guide the relative movement of the shaft 30 may be formed in the other such that smooth movement of the carrier 20 is achieved. Hereinafter, the embodiment will be described as having the structure in which the shaft 30 is provided on the base 10 and the shaft guide groove 21*a* is provided in the carrier 20.

As shown in FIG. 1, the carrier 20 may be configured to be movable upward and downward, in which case the optical axis direction L is a vertical direction.

Figure 11:
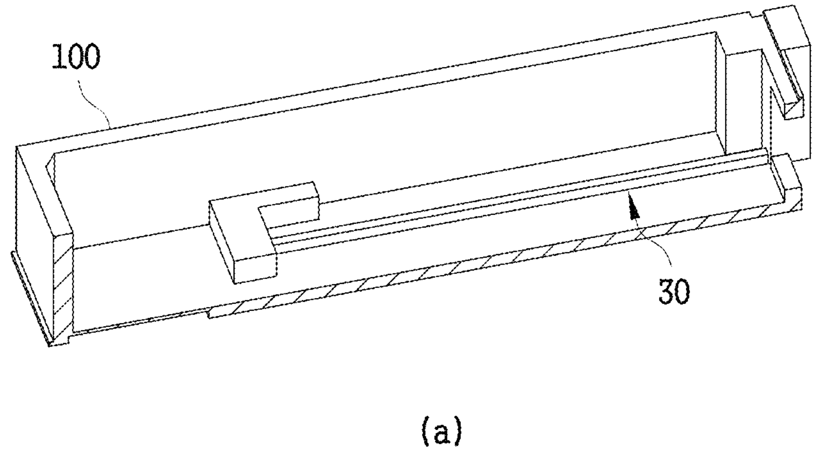
FIG. 11 is a sectional view of a base according to another embodiment of the present invention when viewed from above (a) and when viewed from below (b)
Figure 11:
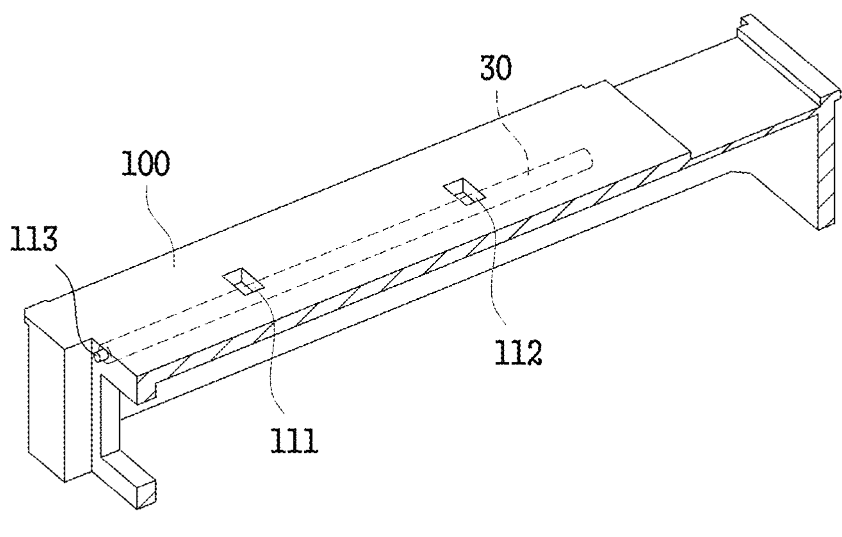

Alternatively, the carrier may be may be configured to be movable in a horizontal direction, in which case the optical axis direction L is the horizontal direction. A base 200 shown in FIG. 11 is configured to guide the movement of the carrier in the horizontal direction, and includes a shaft 30 aligned in the horizontal direction.

The base 10 may be formed by injecting a synthetic resin in the state in which the shaft 30 is inserted into a mold. The shaft 30 may be provided on the base 10 and, correspondingly, a plurality of shaft guide grooves 21*a* may be provided in the carrier 20.

Referring to FIG. 4, a pair of shaft fixing protrusions 12*a* and 12*b* may protrude from an inner peripheral surface 11 of the base 10 in the state in which the shaft 30 is disposed therebetween. As shown in FIG. 6(*a*), the shaft fixing protrusions 12*a* and 12*b* may protrude farther than the center O of the shaft 30 such that the circular shaft 30 may remain firmly inserted without being dislodged from the base 10.

Meanwhile, when the base 10 is formed as a roughly quadrangular shape, as shown in FIGS. 1 to 3, the shaft 30 may be provided at each of two adjacent vertex portions of the quadrangle. However, the present invention is not limited thereto, and the shaft may be provided at each of the other adjacent vertex portions of the quadrangle.

The shaft 30 may be made of metal and may be generally formed as a long bar shape, and at least a part of the shaft located in the shaft guide groove 21*a* may be configured to have a cross-section of the same shape.

The base 10 and the carrier 20 may be disposed such that one surrounds the other when viewed in the optical axis direction L. In this case, the shaft 30 may be disposed on an inner peripheral surface of the one, and the shaft guide groove 21*a* may be disposed in an outer peripheral surface of the other that faces the inner peripheral surface of the one.

In the embodiment, the base 10 is shaped so as to wrap around the carrier 20, the shaft 30 is disposed on the inner peripheral surface 11 of the base 10, and the shaft guide groove 21*a* is formed in the outer peripheral surface 21 of the carrier 20.

The shaft guide groove 21*a* may include a bottom surface 21*a*1 and first and second inclined surfaces 21*a*2 and 21*a*3 extending obliquely from both sides of the bottom surface 21*a*1, respectively, to form an inlet through which the shaft 30 is inserted. The first inclined surface **21*a*2 and the second inclined surface 21*a*3 may be symmetrically disposed on both sides of the bottom surface 21*a*1**.

The first inclined surface **21*a*2 and the second inclined surface 21*a*3 may extend from both sides of the bottom surface 21*a*1, respectively, such that the distance therebetween gradually increases. That is, the angle between the first inclined surface 21*a*2 or the second inclined surface 21*a*3 and the bottom surface 21*a*1** may be an obtuse angle.

A position adjustment hole 13 through which a lower end of the shaft 30 is exposed may be formed in a lower surface of the base 10. At least a part of the lower end of the shaft 30 may be visible through the position adjustment hole 13. The position adjustment hole 13 may be formed with a size smaller than the cross-sectional area of the end of the shaft 30 such that the shaft 30 cannot extend through the position adjustment hole 13. The position adjustment hole 13 may be cylindrical or conical (see FIG. 5(*a*)); however, the present invention is not necessarily limited thereto.

Meanwhile, the base 10 may be provided in the outer peripheral surface thereof with at least one position adjustment hole 14 and 15 disposed in the longitudinal direction of the shaft 30. A plurality of position adjustment holes 14 and 15 may be disposed in the optical axis direction L. The shaft 30 may be exposed through the position adjustment holes 14 and 15.

Each of the position adjustment holes 14 and 15 may not be completely formed through the base 10 from the inner peripheral surface to the outer peripheral surface of the base, but may form a recess formed in outer peripheral surface of the base 10 so as to have a depth that does not reach the inner peripheral surface of the base, and an opening through which the shaft 30 is exposed may be formed in a bottom surface of the recess.

A mold (not shown) for injection molding the base 10 may be provided with a shaft support portion (not shown) configured to locate the shaft 30 at a predetermined point in the mold. At least a part of the shaft 30 may be supported by the shaft support portion. A plurality of shaft support portions may be provided for one shaft 30, in which case the shaft support portions may be spaced apart from each other in the longitudinal direction of the shaft 30, and each of the shaft support portions may be configured to support the shaft 30.

In the embodiment, two shaft support portions are provided for one shaft 30, the shaft support portions may support the middle and a lower end of the shaft 30, respectively, whereby two position adjustment holes 14 and 15 are formed in the base 10 so as to correspond to one shaft 30, as shown in FIG. 3(*b*). That is, the space in the mold occupied by the shaft support portions is not filled with an injection resin, and therefore cavity-shaped position adjustment holes 14 and 15 are formed.

Meanwhile, in the state in which the shaft 30 is placed on the shaft support portions as described above, the position of the shaft 30 in the optical axis direction L may be adjusted using the position adjustment holes 13 and 23.

The mold may be provided with a stopper (not shown) configured to adjust the position of the shaft 30 in the optical axis direction (or the longitudinal direction). The stopper may be fixedly disposed in the mold to limit or constrain the movement of the shaft 30, or may be configured to be movable relative to the mold in the optical axis direction L in order to finely adjust the position of the shaft 30 while contacting or being separated from the end of the shaft 30.

The stopper may be formed in a shape extending long in one direction, such as a pin, a bar, or a protrusion, and the position adjustment holes 13 and 23 formed in the base 10 may correspond to the stopper. That is, the position adjustment holes may be formed by cavities generated as a result of the space in the mold occupied by the stopper being not filled with an injection resin.

Figure 9:
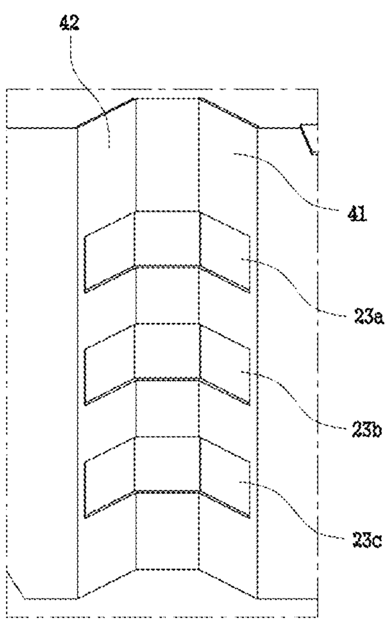
FIG. 9 is a view showing the inside of a shaft guide groove.

Meanwhile, referring to FIG. 9, a first guide surface portion 41 made of metal may be disposed on the first inclined surface **21*a*2 in contact with the shaft 30. A second guide surface portion 42 made of metal may be disposed on the second inclined surface 21*a*3 in contact with the shaft 30**.

The part of each of the first guide surface portion 41 and the second guide surface portion 42 in contact with the shaft 30 may be flat. The first and second guide surface portions 41 and 42 may be integrally formed with the carrier 20 by injecting the carrier 20 in the state in which the first guide surface portion 41 and the second guide surface portion 42 are inserted in the mold. However, the present invention is not limited thereto, and the first guide surface portion 41 and/or the second guide surface portion 42 may be fixed to the inclined surfaces **21*a*2 and 21*a*3** using various methods, such as adhesion, fusion, and attachment.

Each of the parts of the shaft 30 in contact with the first and second guide surface portions 41 and 42 may have a regular shaped cross-section. The cross-section of the shaft 30 is preferably circular, in which case the part of the shaft 30 in contact with the first guide surface portion 41 or the second guide surface portion 42 may be straight.

Since the shaft 30 and the guide surface portions 41 and 42 are in line contact with each other, it is possible to reduce the contact area between the shaft 30 and the guide surface portions 41 and 42 during the movement of the carrier 20.

Figure 13:
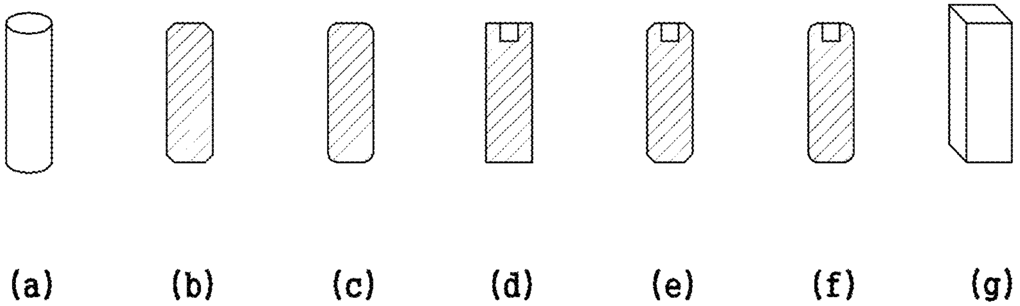
FIG. 13 is a view showing various embodiments of the shaft.

However, the present invention is not limited thereto, and when the cross-section of the shaft 30 is configured to include a straight line (see FIG. 13(*g*)), the first guide surface portion 41 and/or the second guide surface portion 42 may be configured to be in surface contact with a flat peripheral portion of the shaft 30 defined by the straight line.

Alternatively, in some embodiments, the guide surface portions 41 and 42 may be excluded, in which case the shaft 30 may be in direct contact with the first and second inclined surfaces **21*a*1 and 21*a*2. At this time, each of the first and second inclined surfaces 21*a*1 and 21*a*2 may be flat, and each of the parts of the shaft 30 in contact with the first and second inclined surfaces 21*a*1 and 21*a*2 may have a regular shaped cross-section. The cross-section of the shaft 30 is preferably circular, in which case the part of the shaft 30 in contact with the first inclined surface 21*a*1 and the second inclined surface 21*a*2** may be straight.

Meanwhile, referring to FIG. 9, at least one lubricant receiving recess **23*a*, 23*b*, and 23*c* configured to receive lubricant may be formed in an inner surface of the shaft guide groove 21. A plurality of lubricant receiving recesses 23*a*, 23*b*, and 23*c* may be disposed in the optical axis direction L. The lubricant receiving recesses 23*a*, 23*b*, and 23*c* may be formed in at least one of the bottom surface 21*a*1, the first inclined surface 21*a*2, and the second inclined surface 21*a*3 of the shaft guide groove 21**.

In particular, when the lubricant receiving recesses **23*a*, 23*b*, and 23*c* are formed over the first inclined surface 21*a*2 and/or the second inclined surface 21*a*3, as in the embodiment, the first guide surface portion 41 and/or the second guide surface portion 42 may be provided on the part other than the parts in which the lubricant receiving recesses 23*a*, 23*b*, and 23*c* are formed. When a predetermined amount of lubricant, such as grease, is introduced into the lubricant receiving recesses 23*a*, 23*b*, and 23*c*, the lubricant may be applied between the shaft 30 and an object in contact with the shaft 30, thereby facilitating relative movement between the shaft 30** and the object.

Figure 7:
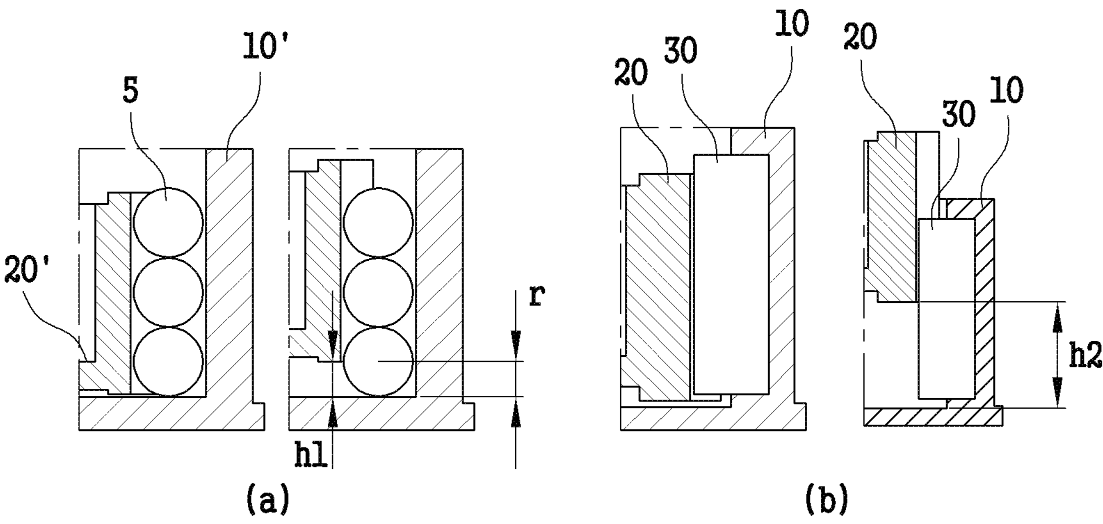
FIG. 7 is a sectional view (a) of a conventional frame module and a sectional view (b) of a frame module according to an embodiment of the present invention.

FIG. 7 is a sectional view (a) of a conventional frame module and a sectional view (b) of a frame module according to an embodiment of the present invention. Referring to FIG. 7, in a conventional structure in which a carrier 20' is moved relative to a base 10' by point contact using a ball 5 (see FIG. 7(*a*)), the driving range h1 within which the carrier 20' can be maximally spaced apart from the bottom of the base 10' may not be greater than the radius r of the ball 5. This is because, if the driving range h1 is greater than the radius r, the ball 5 may move out of position.

In the present invention, on the other hand, a driving range h2 is greater than the conventional driving range (h2>r>h1) because the shaft 30 is in line contact with the object, as shown in FIG. 7(*b*).

Figure 8:
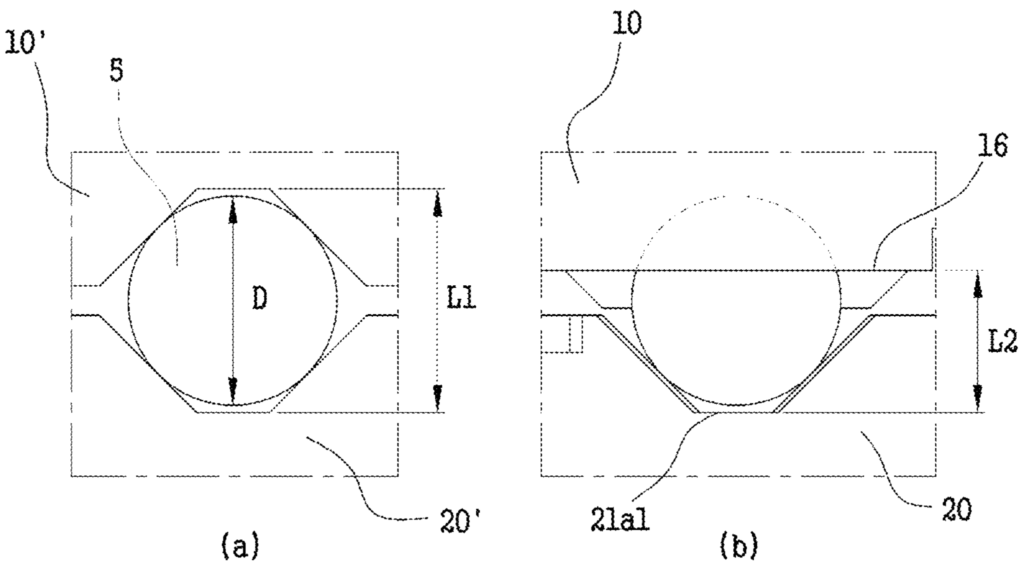
FIG. 8 is a view (a) showing the distance between mold surfaces in a conventional structure and a view (b) showing the distance between mold surfaces in an embodiment of the present invention.

FIG. 8 is a view (a) showing the distance between mold surfaces in the conventional structure and a view (b) showing the distance between mold surfaces in the embodiment of the present invention. Referring to FIG. 8, in a conventional structure in which recesses formed respectively in the base and the carrier are located in the space in which the ball 5 is received, the maximum distance L1 between a first surface of a first mold configured to form the base and a second surface of a second mold configured to form the carrier must be greater than the diameter D of the ball 5, as shown in FIG. 8(*a*). Here, the first surface and the second surface are surfaces constituting the recess in which the ball 5 is received.

In the present invention (see FIG. 8(*b*)), on the other hand, the distance between a first surface 16 of a first mold configured to form the base 10 and a second surface **21*a*1 of a second mold configured to form the carrier 20 may be reduced compared to the conventional structure (L2<L1). Here, the first surface 16 is defined as the surface from which the shaft fixing protrusions 12*a* and 12*b* protrude, and the second surface 21*a*1 is defined as the bottom surface 21*a*1 of the shaft guide groove 21*a***.

That is, since the present invention does not require assembly of the ball, the distance may be reduced (L2<L1) compared to the conventional structure in which the distance L1 between the base and the carrier must be greater than the diameter of the ball, thereby improving the utilization of an inner space of a product, and the distance may be further adjusted according to the dimensions of the product.

Figure 10:
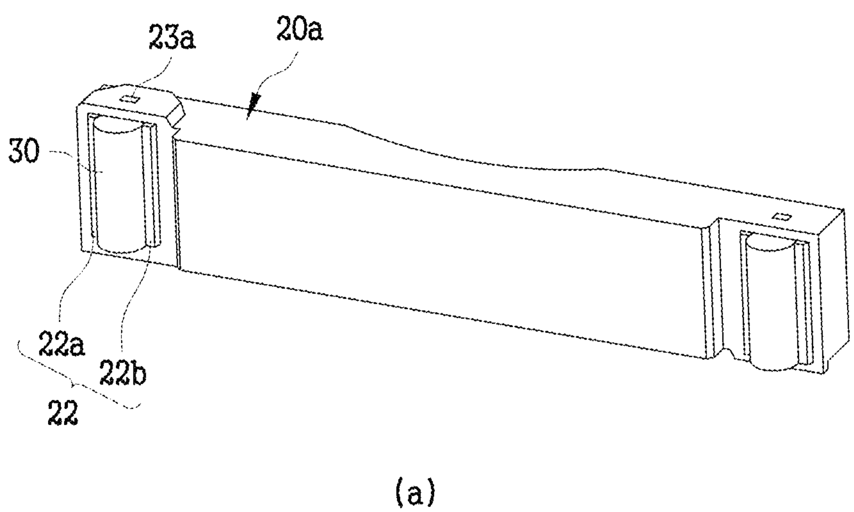
FIG. 10 is a sectional view of an assembly of a carrier and a shaft according to another embodiment of the present invention when viewed from outside (a) and when viewed from inside (b)
Figure 10:
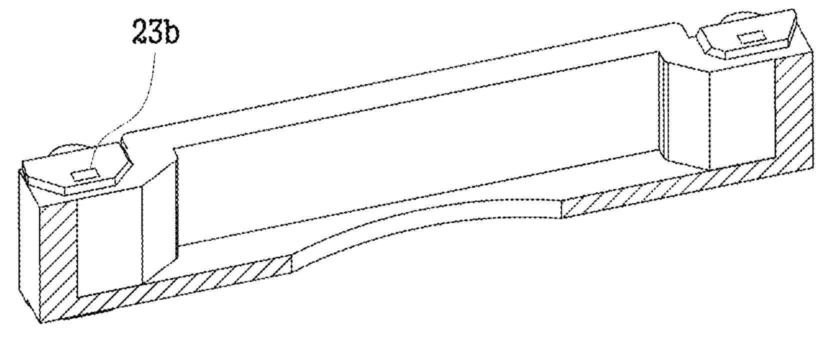

FIG. 10 is a sectional view of an assembly of a carrier and a shaft according to another embodiment of the present invention when viewed from outside (a) and when viewed from inside (b). Referring to FIG. 10, in the embodiment, the shaft 30 may be disposed on an outer peripheral surface of the carrier **20*a***. A shaft guide groove (not shown) may be disposed in an inner peripheral surface of a base (not shown).

In this case, shaft fixing protrusions **22*a* and 22*b* may be formed on the outer peripheral surface of the carrier 20*a*, and position adjustment holes 23*a* and 23*b* may be formed in an upper surface and a lower surface of the carrier 20*a***, respectively.

Figure 12:
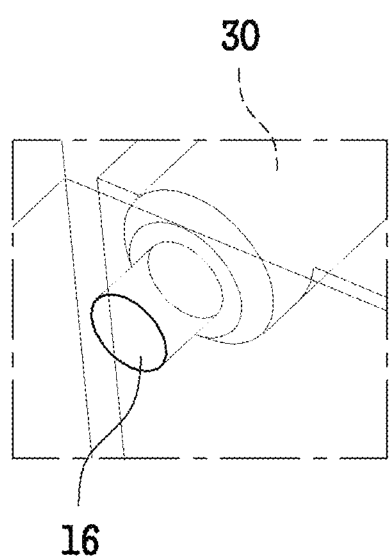
FIG. 12 is an enlarged view of a position adjustment hole shown in FIG. 11.

FIG. 11 is a sectional view of a base according to another embodiment of the present invention when viewed from above (a) and when viewed from below (b). FIG. 12 is an enlarged view of a position adjustment hole shown in FIG. 11.

Referring to FIGS. 11 and 12, in the embodiment, a frame module may be configured such that a carrier (not shown) is moved relative to the base 100 in the horizontal direction. In this case, a shaft 30 may be fixed to the base 100 or the carrier in a state of being aligned in the horizontal direction.

When the shaft 30 is fixed to the base 100, as in the embodiment, position alignment holes 111 and 122 may be formed in a lower surface of the base 100, and a position adjustment hole 113 may be formed in a side surface of the base 100.

FIG. 13 is a view showing various embodiments of the shaft, wherein FIGS. 13(*a*) and 13(*g*) are perspective views of the shafts according to the embodiments, and FIGS. 13(*b*) to 13(*f*) are longitudinal sectional views of the shaft according to the embodiments.

Referring to FIG. 13, the shaft 30 may have a cylindrical shape (a), a shape in which the edge of an upper/lower end having a cylindrical shape is chamfered (b), a shape in which the edge of an upper/lower end of a cylinder is curved (c), a shape in which a recess is formed in one end of a cylinder (d), a shape in which a recess into which a stopper is inserted is formed in one end of a cylinder and an edge surrounding the recess is chamfered (e), a shape in which a recess into which a stopper is inserted is formed in one end of a cylinder and an edge surrounding the recess is curved (f), or a quadrangular prism shape (preferably having a rectangular or square cross-section) (g).

As is apparent from the above description, a frame module of an optical actuator according to the present invention has the effect that the movement of a carrier is performed by line contact using a shaft instead of conventional point contact using a ball, whereby pressure is distributed, and therefore it is possible to inhibit stamping and denting, and the wear resistance of the part in contact with the shaft is improved, and therefore it is possible to increase the lifespan of a product.

In addition, the present invention has the effect that a sufficient level of straightness is guaranteed by the shaft, whereby it is possible to prevent vibration of the actuator during driving thereof and to achieve precise operation of the actuator.

Furthermore, the present invention has the effect that a conventional ball assembly process is omitted, whereby it is possible to simplify assembly and to reduce cost, and the occurrence of assembly variables is minimized, whereby it is possible to reduce defects.

The technical ideas described in the embodiments of the present invention may be practiced independently or in combination. In addition, although the present invention has been described based on the embodiments described in the detailed description of the invention given with reference to the drawings, these embodiments are exemplary only, and those skilled in the art to which the present invention pertains will appreciate that various modifications and equivalents thereto are possible therefrom. Accordingly, the technical protection scope of the present invention is to be defined by the appended claims.

What is claimed is:

1. A frame module of an optical actuator, the frame module comprising:

a base;

a carrier configured to be movable relative to the base in an optical axis direction; and a shaft disposed on any one of the base and the carrier, the shaft being disposed long in the optical axis direction, the shaft being made of metal, wherein the other of the base and the carrier comprises a shaft guide groove extending in the optical axis direction from a surface facing the shaft, the shaft guide groove being configured to receive at least a part of the shaft thereinto, wherein the base and the carrier are made of a synthetic resin and the shaft is partially embedded in one surface of any one of the base and the carrier by insert injection molding, wherein the shaft guide groove comprises:

a bottom surface; and first and second inclined surfaces extending obliquely from both sides of the bottom surface, respectively, wherein the exposed portion of the shaft is in direct linear sliding contact with the first and second inclined surfaces during movement of the carrier in the optical axis direction, wherein a lubricant receiving recess is formed in an inner surface of the shaft guide groove, the lubricant receiving recess being formed on the first and/or second inclined surface and being configured to supply lubricant to sliding contact regions between the exposed portion of the shaft and the first and second inclined surfaces, wherein the any one of the base and the carrier on which the shaft is disposed further comprises a pair of shaft fixing protrusions protruding from an inner peripheral surface of the any one of the base and the carrier, the shaft being disposed between the pair of shaft fixing protrusions, and each of the pair of shaft fixing protrusions protruding farther than a center of the shaft.

2. The frame module according to claim 1, wherein the base and the carrier are disposed such that one surrounds the other when viewed in the optical axis direction, the shaft is disposed on an inner peripheral surface of the one, and the shaft guide groove is disposed in an outer peripheral surface of the other facing the inner peripheral surface of the one.

3. The frame module according to claim 2, wherein the shaft guide groove further comprises:

a first guide surface portion disposed on the first inclined surface, the first guide surface portion being in contact with a first side of the portion of the shaft not embedded, the first guide surface portion being made of metal; and a second guide surface portion disposed on the second inclined surface, the second guide surface portion being in contact with a second side of the portion of the shaft not embedded, the second guide surface portion being made of metal.

4. The frame module according to claim 1, wherein the base and the carrier are disposed such that one surrounds the other when viewed in the optical axis direction, the shaft is disposed on an outer peripheral surface of the other, and the shaft guide groove is disposed in an inner peripheral surface of the one facing the outer peripheral surface of the other.

5. The frame module according to claim 4, wherein the shaft guide groove further comprises:

a first guide surface portion disposed on the first inclined surface, the first guide surface portion being in contact with a first side of the portion of the shaft not embedded, the first guide surface portion being made of metal; and a second guide surface portion disposed on the second inclined surface, the second guide surface portion being in contact with a second side of the portion of the shaft not embedded, the second guide surface portion being made of metal.

6. The frame module according to claim 1, wherein a plurality of the lubricant receiving recesses are formed in series along the optical axis direction.

7. The frame module according to claim 6, wherein each of the plurality of lubricant receiving recesses is formed across the bottom surface, the first inclined surface, and the second inclined surface of the shaft guide groove.

* * * * *